(12) United States Patent
Nishida et al.

(10) Patent No.: US 11,402,690 B2
(45) Date of Patent: Aug. 2, 2022

(54) BACKLIGHT UNIT AND LIQUID CRYSTAL DISPLAY DEVICE INCLUDING THE SAME

(71) Applicant: SAMSUNG ELECTRONICS CO., LTD., Suwon-si (KR)

(72) Inventors: Yasuhiro Nishida, Suwon-si (JP); Farid Mukhtarov, Suwon-si (KR); Dae Sik Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/282,282

(22) PCT Filed: May 22, 2019

(86) PCT No.: PCT/KR2019/006145
§ 371 (c)(1),
(2) Date: Apr. 1, 2021

(87) PCT Pub. No.: WO2020/071610
PCT Pub. Date: Apr. 9, 2020

(65) Prior Publication Data
US 2021/0389628 A1  Dec. 16, 2021

(30) Foreign Application Priority Data

Oct. 1, 2018 (KR) .......... 10-2018-0117217

(51) Int. Cl.
*G02F 1/13357* (2006.01)

(52) U.S. Cl.
CPC .. *G02F 1/133606* (2013.01); *G02F 1/133605* (2013.01); *G02F 1/133603* (2013.01); *G02F 1/133608* (2013.01)

(58) Field of Classification Search
CPC ......... G02F 1/133606; G02F 1/133605; G02F 1/133603; G02F 1/133608
(Continued)

(56) References Cited

U.S. PATENT DOCUMENTS

2007/0211205 A1* 9/2007 Shibata ............... H05K 7/2099
349/161
2007/0229729 A1* 10/2007 Nishiyama .......... G02B 6/0053
349/62
(Continued)

FOREIGN PATENT DOCUMENTS

JP   2002139729 A    5/2002
JP   2012209087 A   10/2012
(Continued)

OTHER PUBLICATIONS

International Search Report (PCT/ISA/210) dated Sep. 24, 2019 issued by the International Searching Authority in International Application No. PCT/KR2019/006145.

*Primary Examiner* — Charles S Chang
(74) *Attorney, Agent, or Firm* — Sughrue Mion, PLLC

(57) ABSTRACT

The disclosure relates a direct type backlight unit, and provides a backlight unit capable of reducing the thickness by maintaining necessary and sufficient optical characteristics and reducing the optical distance (OD), and a liquid crystal display apparatus including the same. Provided is a backlight unit including: light source; a diffusion plate provided to diffuse light emitted from the light source; and an optical sheet disposed between the light source and the diffusion plate and having a plurality of protrusions having a pyramidal shape and the plurality of protrusions protrude toward the light source so that light emitted from the light source is incident onto the plurality of protrusions.

14 Claims, 14 Drawing Sheets

(58) Field of Classification Search
USPC .................................................. 349/61–68
See application file for complete search history.

(56) References Cited

U.S. PATENT DOCUMENTS

| | | | |
|---|---|---|---|
| 2010/0026703 A1* | 2/2010 | Parker .................. | G02B 6/0073 345/589 |
| 2010/0124047 A1* | 5/2010 | Ahn ....................... | G02B 5/045 362/97.3 |
| 2014/0211483 A1* | 7/2014 | Cho ....................... | F21V 11/16 362/311.01 |
| 2017/0357047 A1 | 12/2017 | Harada et al. | |

FOREIGN PATENT DOCUMENTS

| | | | |
|---|---|---|---|
| JP | 2012234047 | A | 11/2012 |
| KR | 100557447 | B1 | 3/2006 |
| KR | 1020070016596 | A | 2/2007 |
| KR | 100739758 | B1 | 7/2007 |
| KR | 1020090070925 | A | 7/2009 |
| KR | 1020100054700 | A | 5/2010 |

* cited by examiner

BACKLIGHT UNIT AND LIQUID CRYSTAL DISPLAY DEVICE INCLUDING THE SAME

TECHNICAL FIELD

The disclosure relates to a backlight unit having an optical film for spreading light incident from a light source, and a liquid crystal display apparatus having the same.

BACKGROUND ART

In recent years, a liquid crystal display apparatus that has been rapidly spreading generally includes a display screen such as a display panel and a backlight unit as a surface light source that illuminates the display screen from the rear side.

There are two types of light emission methods of the backlight unit: a direct type and an edge type.

Direct type backlight is used in high-end models due to performing two-dimensional divisional driving (local dimming) and obtaining light-emitting characteristics close to those of self-luminous displays.

In the direct type backlight, there is a need to install a diffusion plate that uniformly diffuses the light emitted from the light source in order to display high-quality images without spots.

Between the diffusion plate and the light source, an optically defined constant optical distance (OD) needs to be secured.

The edge type backlight uses a light guide plate, which makes it relatively easy to reduce the thickness, while as for a liquid crystal display apparatus including a direct type backlight unit, the need to secure an optical distance (OD) is a major impediment to the thickness reduction.

As one of the methods for shortening the optical distance (OD), there is a direct type backlight that provides a lens near a light source to diffuse light emitted from the light source through the lens.

However, the direct type backlight including the lens requires an arrangement to correspond the light source and the lens with each other, and when the number of light sources increases, the number of assembly processes may increase proportionally.

In addition, in the direct type backlight including the lens, a blooming phenomenon may occur in which light leaks out from the display panel in the transverse direction during local driving since the lens excessively diffuses light emitted from the light source.

DISCLOSURE

Technical Problem

The disclosure relates a direct type backlight unit, and provides a backlight unit capable of reducing the thickness by maintaining necessary and sufficient optical characteristics and reducing the optical distance (OD), and a liquid crystal display apparatus including the same.

Technical Solution

One aspect of the disclosure provides a backlight unit including: light source; a diffusion plate provided to diffuse light emitted from the light source; and an optical sheet disposed between the light source and the diffusion plate and having a plurality of protrusions having a pyramidal shape and the plurality of protrusions may protrude toward the light source so that light emitted from the light source is incident onto the plurality of protrusions One ends of the plurality of protrusions facing the light source may include a flat vertex.

An area of the vertex may be 20% or less of an area of the plurality of protrusions.

A distance between the optical sheet and the light source may be 50% or less of a distance between the diffusion plate and the light source.

The optical sheet may be configured to retroreflect light incident on the optical sheet.

The plurality of protrusions may have a triangular pyramid shape.

The plurality of protrusions may have a square pyramid shape.

The light sources may provided in plural, and a distance between the diffusion plate and the light source may be smaller than a square root of a number obtained by dividing an area of the display panel into which light diffused from the diffusion plate is incident, by the number of the plurality of light sources.

The backlight unit may further include a spacer disposed between the optical sheet and a substrate on which the light source is mounted to support the optical sheet.

Another aspect of the disclosure provides an liquid crystal display apparatus including: a display panel; and a backlight unit having a plurality of light sources provided to emit light to the display panel, and the backlight unit further includes a diffusion plate disposed between the display panel and the plurality of light sources, and an optical sheet disposed between the light source and the diffusion plate and having a plurality of protrusions having a pyramidal shape, and the plurality of protrusions may protrude toward the light source so that light emitted from the light source is incident onto the plurality of protrusions In another aspect of the disclosure, a backlight unit includes a light source, a diffusion plate provided to diffuse light emitted from the light source, and an optical sheet disposed between the light source and the diffusion plate and having a plurality of prismatic protrusions arranged in succession, and the plurality of protrusions may protrude toward the light source so that light emitted from the light source is incident onto the plurality of protrusions One ends of the plurality of protrusions facing the light source may include a flat vertex.

An area of the vertex may be 20% or less of the area of the plurality of protrusions.

A distance between the optical sheet and the light source may be 50% or less of a distance between the diffusion plate and the light source.

The light sources may provided in plurality, and a distance between the diffusion plate and the light source may be smaller than a square root of a number obtained by dividing an area of the display panel into which light diffused from the diffusion plate is incident, by the number of the plurality of light sources.

Advantageous Effects

The disclosure relates a direct type backlight unit, and can reduce the thickness of the backlight unit and the liquid crystal display apparatus including the same by maintaining necessary and sufficient optical characteristics and reducing the optical distance (OD).

MODES OF THE DISCLOSURE

Figure 1:
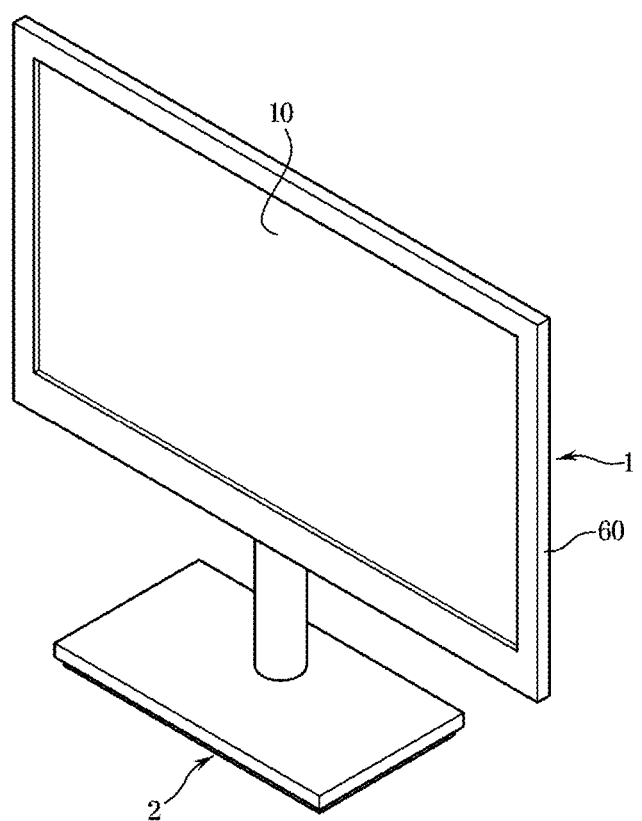
FIG. 1 is a perspective view of a liquid crystal display according to an embodiment of the disclosure.

The embodiments set forth herein and illustrated in the configuration of the disclosure are only the most preferred embodiments and are not representative of the full technical spirit of the disclosure, so it should be understood that they may be replaced with various equivalents and modifications at the time of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "upper", "lower", "top", and "bottom" as herein used are defined with respect to the drawings, but the terms may not restrict the shape and position of the respective components.

Hereinafter, a display apparatus according to the first embodiment of the disclosure will be described in detail with reference to the accompanying drawings.

Figure 2:
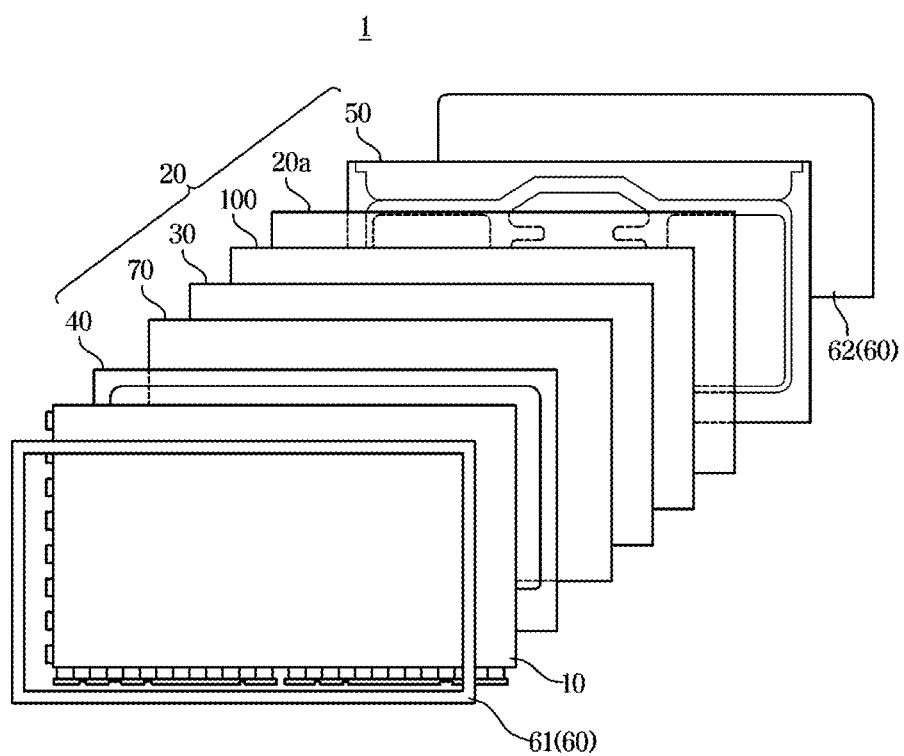
FIG. 2 is an exploded view of a liquid crystal display according an embodiment of the disclosure.

FIG. 1 is a perspective view of a liquid crystal display according to an embodiment of the disclosure. FIG. 2 is an exploded view of a liquid crystal display according an embodiment of the disclosure.

As shown in FIGS. 1 and 2, the liquid crystal display 1 may include a device that displays an image, such as a television, a monitor, and a display apparatus of a mobile communication terminal.

The liquid crystal display 1 may display an image and output sound. Here, the sound may be output through an external device. The liquid crystal display 1 may be supported by a stand 2 mounted at the bottom, and may be installed on a wall by a separate bracket or the like.

Hereinafter, the liquid crystal display apparatus 1 according to the disclosure will be described with a focus on a liquid crystal display apparatus 1 that allows an image to be viewed through a display panel 10 by adjusting a transmission amount of light emitted from a backlight unit 20 among the liquid crystal display apparatus. However, the disclosure is not limited thereto.

The liquid crystal display 1 may include a display panel 10, a backlight unit 20, and a housing 60. The backlight unit 20 may include a light source module 20a, a diffusion plate 30, an optical film 70, a middle mold 40, and a bottom chassis 50.

The light source module 20a may include a light source 21 (see FIG. 3), a substrate 22 (see FIG. 3) configured to drive the light source 21 to output light, and a reflective film (not shown) configured to reflect light.

The display panel 10 is a panel that displays image information such as letters, numbers, and arbitrary icons by adjusting the transmittance of light passing through the liquid crystal layer, and may include a large panel of approximately 60 inches or more.

Here, the transmittance of light passing through the liquid crystal layer may be adjusted according to the intensity of the applied voltage.

The display panel 10 may include a color filter panel, a thin film transistor array panel (TFT), a liquid crystal layer, and a sealant. Here, the color filter panel and the TFT panel may be made of a glass material.

The color filter panel may include red, green, and blue color filters formed in regions corresponding to the pixel electrodes of the TFT panel so that colors are displayed for each pixel. A common electrode made of a transparent conductive material such as Indium Tin Oxide (ITO) or Indium Zinc Oxide (IZO) may be formed on the color filter panel.

The backlight unit 20 is a light source device that emits light from a lower portion of the display panel 10 and may include a direct type light source device. The backlight unit 20 may include a light source module 20a including a light source 21 for outputting light and a substrate 22 for driving the light source 21 so that light is output from the light source 21; a reflective film (not shown); a diffusion plate 30; an optical film 70; a middle mold 40; and a bottom chassis 50.

The light source 21 may include a light emitting diode (LED) that generates light with high efficiency and low power. The light emitting diode may be provided in the form of a package in which a chip is mounted on the substrate 22 and filled with a resin.

However, unlike an embodiment of the present invention, a cold cathode fluorescent lamp (CCFL) or an external electrode fluorescent lamp (EEFL) may be used as the light source 21.

The substrate 22 supplies or cuts off power applied to the light emitting diode or controls the amount of power supplied to the light emitting diode, and may include a printed circuit board (PCB) on which a plurality of light emitting diodes are electrically mounted.

A plurality of light sources 21 may be mounted on the substrate 22 to be spaced apart at predetermined intervals.

The reflector sheet (not shown) may perform reducing the loss of luminance of the display panel 10 by reflecting the light reflected by the diffusion plate 30 or the optical film 70 back toward the display panel 10.

The diffusion plate 30 is disposed between the light source 21 and the optical film 70 in the backlight unit 20, and may include a translucent panel that makes the color and brightness appear uniform throughout the screen by diffusing the light from the light source 21 along the plane.

The diffusion plate 30 may also serve as a support for supporting the optical film 70. The optical film 70 may be supplied to the display panel 10 by improving the brightness of light uniformly diffused by the diffusion plate 30.

The liquid crystal display apparatus 1 according to the disclosure may include an optical sheet 100 disposed between the diffusion plate 30 and the light source 21 to diffuse light emitted from the light source 21. The optical sheet 100 will be described in detail below.

The middle mold 40 may form the backlight unit 20 by integrating the display panel 10, the diffusion plate 30, the light source sheet 100, and the bottom chassis 50.

The bottom chassis 50 is a panel that connects various components required for image display and sound output, and a substrate 22 and an input/output device may be mounted on the bottom chassis 50.

The bottom chassis 50 is one of the components constituting the backlight unit 20 and may also support other components constituting the backlight unit 20.

The bottom chassis 50 may be made of a metal having excellent heat dissipation and strength. A driving module for driving the display panel 10 and the backlight unit 20 may be disposed in the bottom chassis 50. The bottom chassis 50 may be made of a conductive material.

The bottom chassis 50 may serve to radiate heat generated from the light source 21 to the outside. Heat generated from the light source 21 is transferred to the bottom chassis 50 via the substrate 22 and may be radiated from the bottom chassis 50.

The bottom chassis 50 may be formed of various metal materials such as aluminum or SUS having good thermal conductivity, or plastic materials such as ABS. A metal PCB made of aluminum having good thermal conductivity may be used for the substrate 22.

Various components of the liquid crystal display 1 such as the bezel 61 and the middle mold 40 may be fixedly supported on the bottom chassis 50. However, unlike an embodiment of the disclosure, at least one of the bezel 61, the middle mold 40, and the bottom chassis 50 may be omitted or may be integrally formed with each other.

The housing 60 may include a bezel 61 and a housing cover 62. The bezel 61 may support the display panel 10. The bezel 61 may fix the display panel 10 supported on the middle mold 40 and may be detachably coupled to the middle mold 40 or the housing cover 62.

The bezel 61 may form an accommodation space when combined with the housing cover 62, and a display panel 10, a backlight unit 20, etc. may be disposed in the accommodation space, and a light source module 20a, a diffusion plate 30, an optical film 70, an optical sheet 100, and a bottom chassis 50 may be disposed in the backlight unit 20.

The housing cover 62 may cover the rear of the bottom chassis 50 to protect and accommodate the bottom chassis 50. The bezel 61 may be made of a non-conductive material. The bezel 61 may include plastic resin or the like. However, the disclosure is not limited thereto. The bezel 61 may include an opening for exposing the display panel 10.

Figure 3:
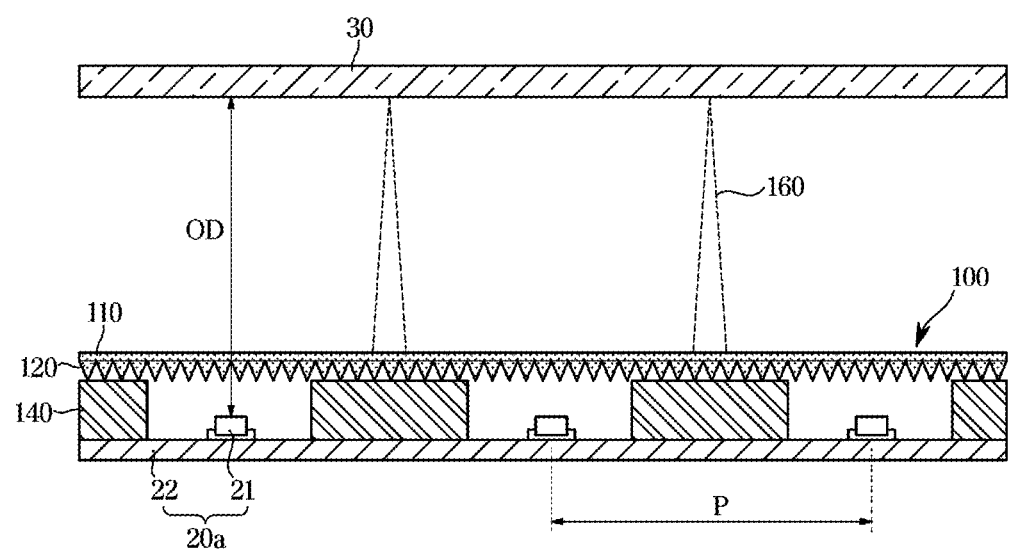
FIG. 3 is a cross-sectional view of a backlight unit illustrating the backlight included in the display apparatus according to an embodiment of the disclosure.
Figure 4:
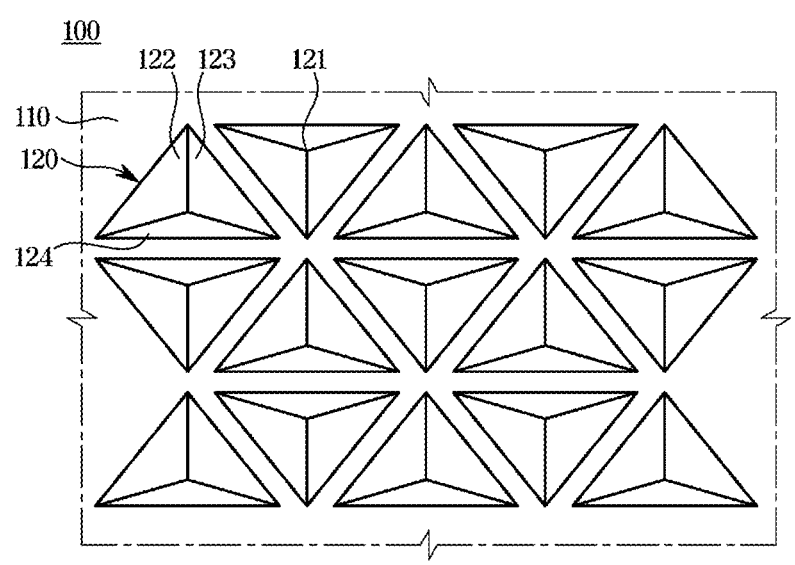
FIG. 4 is a view illustrating a protrusion of an optical sheet in a backlight unit according to an embodiment of the disclosure.
Figure 5:
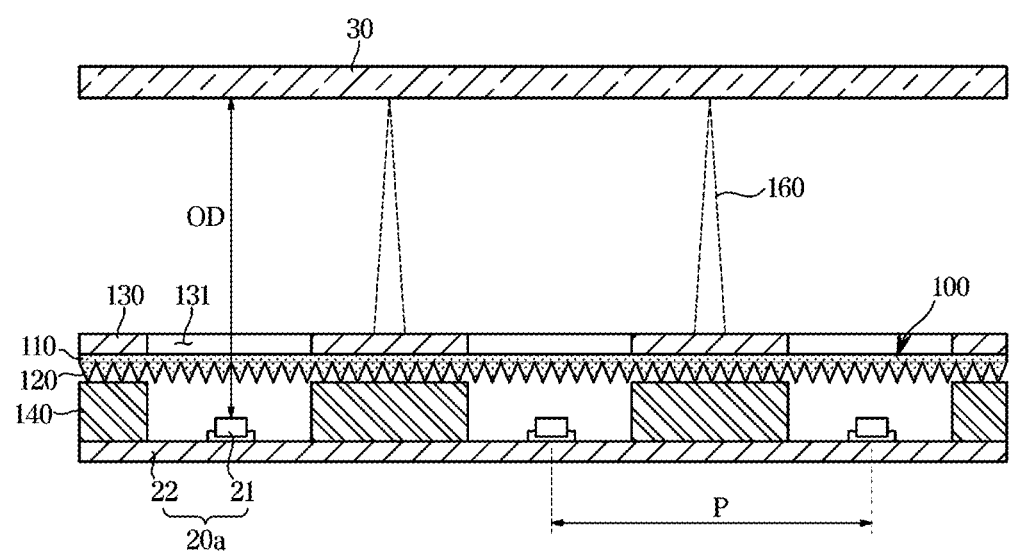
FIG. 5 is a cross-sectional view of a backlight unit including a reflector sheet according to an embodiment of the disclosure.
Figure 6:
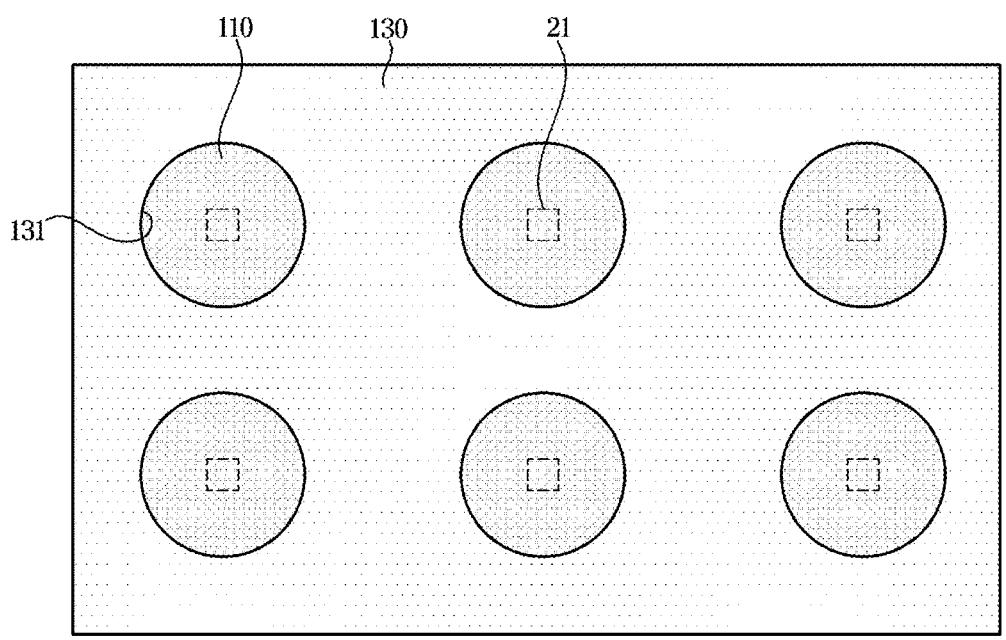
FIG. 6 is a plan view of the reflector sheet shown in FIG. 5.

FIG. 3 is a cross-sectional view of a backlight unit illustrating the backlight included in the display apparatus according to an embodiment of the disclosure. FIG. 4 is a view illustrating a protrusion of an optical sheet in a backlight unit according to an embodiment of the disclosure. FIG. 5 is a cross-sectional view of a backlight unit including a reflector sheet according to an embodiment of the disclosure. FIG. 6 is a plan view of the reflector sheet shown in FIG. 5.

As shown in FIGS. 3 to 6, The liquid crystal display apparatus 1 (see FIG. 1) according to an embodiment of the disclosure may include a backlight unit 20 (see FIG. 2) and an optical sheet 100 disposed between the diffusion plate 30.

Unlike the edge-type liquid crystal display, the direct type liquid crystal display 1 may directly supply light emitted from the light source 21 to the display panel 10 (see FIG. 2).

In this case, the optical sheet 100 may be disposed between the light source 21 and the display panel 10 in order to improve the optical characteristics emitted from the light source 21.

The liquid crystal display apparatus 1 needs to shorten the optical distance (OD) from the light source 21 to the diffusion plate 30 in order to be thinner.

In general, the minimum distance from the light source 21 to the diffusion plate 30 and the average distance P of the plurality of light sources 21 disposed on the substrate 22 may be similar.

Here, the average distance P of the light sources 21 means the square root of the number obtained by dividing the area of the display panel 10 by the number of light sources 21.

Therefore, when the minimum distance (OD) from the light source 21 to the diffusion plate 30 is shortened in order to reduce the thickness of the liquid crystal display apparatus 1, the average distance P of the plurality of light sources 21 is also shortened, and installation of more light sources 21 may be required.

Since installing many light sources 21 can incur a large cost, in order to solve this problem, it needs to diffuse the light emitted from the light source 21 so that the minimum distance (OD) from the light source 21 to the diffusion plate 30 may be shortened while maintaining the average distance P of the plurality of light sources 21.

In order to further diffuse the light emitted from the light source 21, a general direct type liquid crystal display apparatus may include a lens disposed adjacent to the light source 21.

However, in a direct type liquid crystal display apparatus including a lens, a corresponding arrangement of the light source 21 and the lens is essential, and when the number of light sources 21 increases, the number of assembly processes may also increase proportionally.

In addition, in a direct type liquid crystal display apparatus including a lens, since the lens diffuses the light emitted from the light source 21 more than necessary, a blooming phenomenon in which light leaks from the display panel 10 in the transverse direction may occur during split driving.

The optical sheet 100 of the liquid crystal display 1 according to an embodiment of the present invention may include a plurality of protrusions 120 protruding toward the light source 21.

A general optical film 70 (see FIG. 2) is disposed between the diffusion plate 30 and the display panel 10, and the optical sheet 100 according to an embodiment of the present invention is disposed between the diffusion plate 30 and the light source 21 unlike the plurality of protrusions of the optical film 70 protruding from the diffusion plate 30 in a direction toward the display panel 10, and the plurality of protrusions 120 of the optical sheet 100 may have a pyramid shape, and A plurality of protrusions 120 having a pyramidal shape may be formed on the side of the incident surface on which light is incident from the light source 21.

Figure 7:
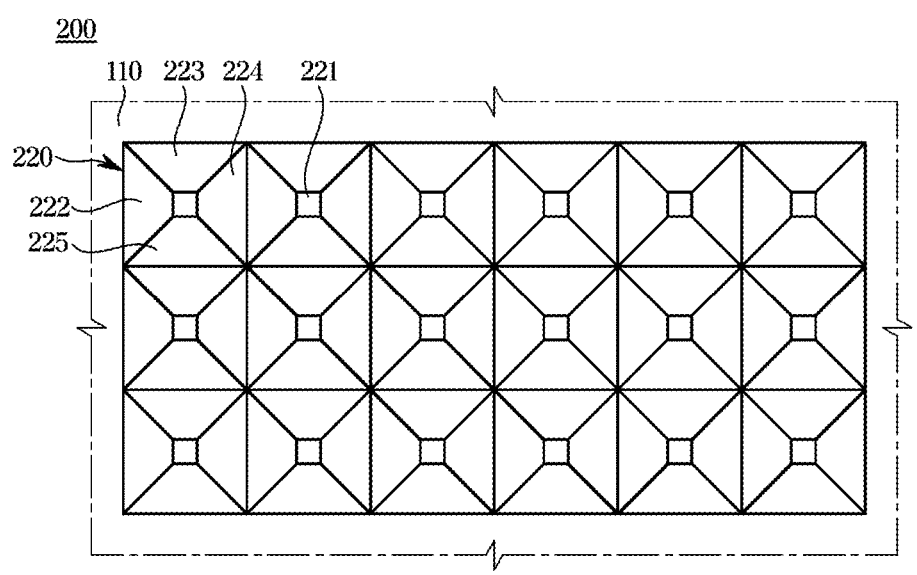
FIG. 7 is a view illustrating a protrusion of an optical sheet in a backlight unit according to another embodiment of the disclosure.

As shown in FIG. 7, the plurality of protrusions 120 having a pyramidal shape included in the optical sheet 100 according to an embodiment of the present invention may have a vertex 121 formed flat, and the flat vertex 121 may be formed on the side of the incident surface where light is incident from the light source 21.

The area of the flat vertex 121 of the plurality of protrusions 120 having a pyramidal shape included in the optical sheet 100 may be 25% or less compared to the area of other portions of the plurality of protrusions 120 having a pyramidal shape.

The area of the flat vertex 121 of the plurality of protrusions 120 having a pyramidal shape included in the optical sheet 100 may be 10% or less compared to the area of other portions of the plurality of protrusions 120 having a pyramidal shape.

The optical sheet 100 is disposed between the light source 21 and the diffusion plate 30, and the optical sheet 100 may be spaced apart from the light source 21 at an interval less than half of the optical distance (OD) between the diffusion plate 30 and the light source 21 so as to be closer to the light source 21 than the diffusion plate 30.

The optical sheet 100 may preferably be spaced apart from the light source 21 at an interval less than 20% of the optical distance (OD) between the diffusion plate 30 and the light source 21 so as to be closer to the light source 21 than the diffusion plate 30.

The liquid crystal display 1 according to an embodiment of the present invention may diffuse light directly emitted from the plurality of light sources 21 by the plurality of protrusions 120 of the optical sheet 100.

Accordingly, the optical distance (OD) between the plurality of light sources 21 and the diffusion plate 30 may be smaller than the average distance P of the plurality of light sources 21.

The liquid crystal display 1 may include a spacer 140 disposed between the optical sheet 100 and the substrate 22 to support the optical sheet 100. The spacer 140 may be provided in plural.

However, the disclosure is not limited thereto, and the spacer 140 may include various shapes and numbers within a limit capable of supporting the position of the optical sheet 100.

The backlight unit 20 may include a pin 160 disposed between the light source 21 and the diffusion plate 30 to support the diffusion plate 30. The pin 160 may be provided in plural.

However, the disclosure is not limited thereto, and the pin 160 may include various shapes and numbers within a limit capable of supporting the position of the diffusion plate 30.

The plurality of protrusions 120 may have a triangular pyramid shape.

The plurality of protrusions 120 may include a first inclined surface 122, a second inclined surface 123, and a third inclined surface 124 inclined toward the vertex 121 from a flat portion 110.

The first inclined surface 122 may be provided between the second inclined surface 123 and the third inclined surface 124, and the second inclined surface 123 may be provided between the first inclined surface 122 and the third inclined surface 124, and the third inclined surface 124 may be provided between the first inclined surface 122 and the second inclined surface 123.

The vertex 121 may be provided between the first inclined surface 122, the second inclined surface 123, and the third inclined surface 124.

The optical sheet 100 may be configured to retroreflect light incident on the optical sheet 100 from the diffusion plate 30.

Here, retroreflection refers to returning light back to its original place, that is, when light reaches an object, the incident ray of light that has arrived is returned and reflected as it is.

It refers to reflection in which light from an object hits an object and returns to its original position. At this time, no matter what angle the object shines, the light is reflected in the direction of the illuminated light.

Retroreflection is generally seen on road signs, and when light from the headlights of a vehicle running at night shines on the road sign, the road sign appears bright to the eyes of the vehicle driver. This is because the light from the headlamp hits the surface of a road sign, which is a reflective product, and then is reflected back to the light source by retroreflection.

That is, the liquid crystal display apparatus 1 according to an embodiment of the present invention includes an optical sheet 100 for retroreflecting light incident from the diffusion plate 30 to prevent light from leaking to the edge of the display panel 10.

The liquid crystal display 1 according to an embodiment of the present invention may include a reflector sheet 130 that reflects light to prevent light loss. The reflector sheet 130 may reflect light to be incident on the diffusion plate 30.

When the light is excessively directed from the optical sheet 100 to the side of the display panel 10, side light may be strongly formed in the image displayed on the liquid crystal display 1, resulting in an inefficient image.

Since the user mainly looks at the liquid crystal display apparatus 1 from the front of the liquid crystal display apparatus 1, it may be inefficient for the side light to be strongly formed.

When the number of light incident obliquely rather than vertically incident on the display panel 10 increases, color reproducibility and luminance of the display panel 10 may be deteriorated. When the amount of light refracted through the optical sheet 100 and obliquely incident on the display panel 10 increases, the performance of the liquid crystal display 1 may be deteriorated.

In the case of the direct type liquid crystal display apparatus 1, since light is directly irradiated from the rear of the display panel 10, the light is irradiated outside the front of the display panel 10 in some cases.

While the direct type liquid crystal display apparatus 1 enables fine local dimming, the brightness of a fine image can be easily adjusted, loss in contrast may occur as the amount of light irradiated to the side of the display panel 10 increases.

The liquid crystal display 1 according to an exemplary embodiment of the present invention may include a reflector sheet 130 disposed between the diffusion plate 30 and the optical sheet 100 to reflect light incident on the optical sheet 100 from the top of the optical sheet 100.

The reflector sheet 130 may include a plurality of holes 131 provided to allow light emitted from the plurality of light sources 21 to pass through the reflector sheet 130. The plurality of holes 131 may correspond to the plurality of light sources 21, respectively.

The reflector sheet 130 may be configured in various ways within a limit capable of reflecting light. For example, it may include forming a sheet by foaming a resin such as polyester or polycarbonate and putting fine air particles therein, mixing two or more components of a resin to form a sheet or forming a sheet by laminating a plurality of resin layers having different refractive indices.

The reflector sheet 130 may have an uneven shape on the surface of the reflector sheet 130. The reflector sheet 130 may include adding inorganic fine particles or the like to the surface of the reflector sheet 130 as necessary.

FIG. 7 is a view illustrating a protrusion of an optical sheet in a backlight unit according to another embodiment of the disclosure. As shown in FIG. 7, the plurality of protrusions 220 may have a square pyramid shape.

The plurality of protrusions 220 may include a vertex 221 facing the backlight unit 20. The protrusions 220 includes a first inclined surface 222, a second inclined surface 223, a third inclined surface 224, and a fourth inclined surface 225 inclined from the flat portion 110 toward the vertex 221.

The vertex 221 of the plurality of protrusions 220 may have a planar shape so as to be parallel to the flat portion 110.

Figure 8:
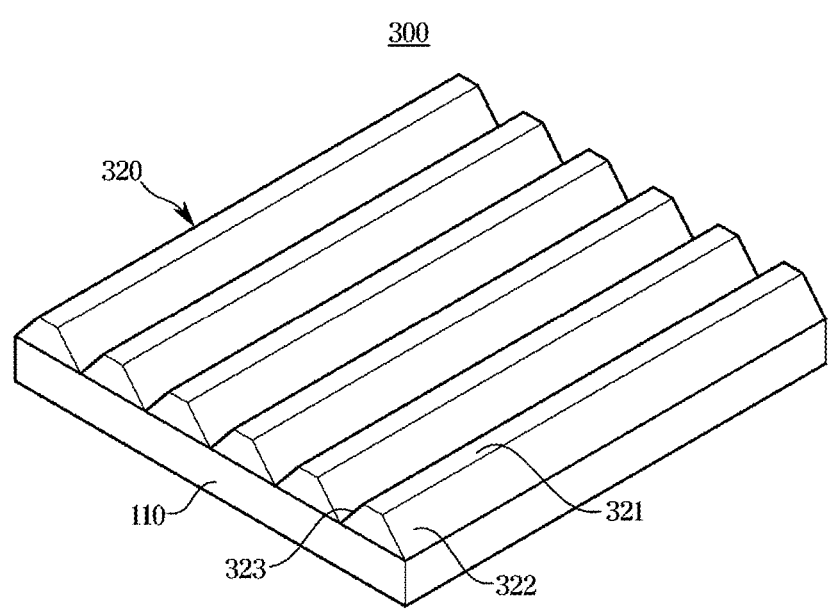
FIG. 8 is a view illustrating a protrusion of an optical sheet in a backlight unit according to another embodiment of the disclosure.
Figure 9:
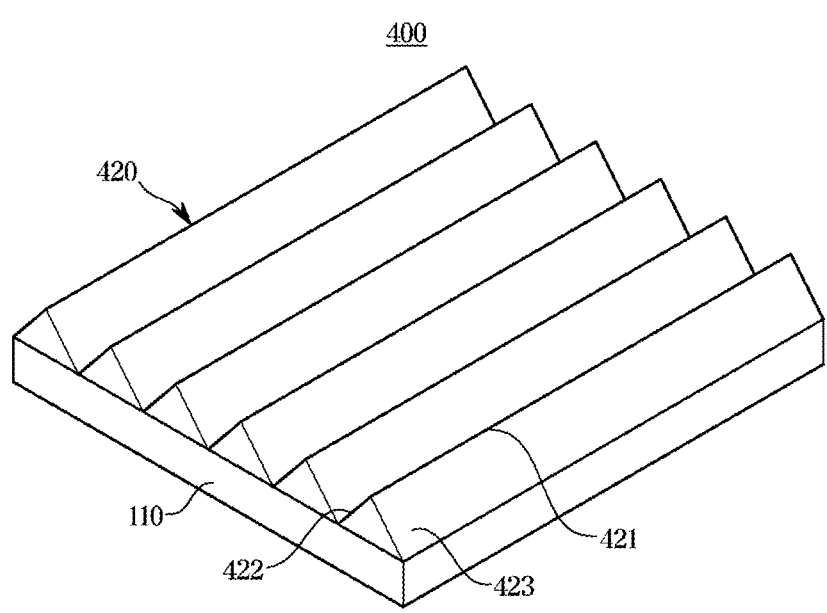
FIG. 9 is a view illustrating a protrusion of an optical sheet in a backlight unit according to another embodiment of the disclosure.
Figure 10:
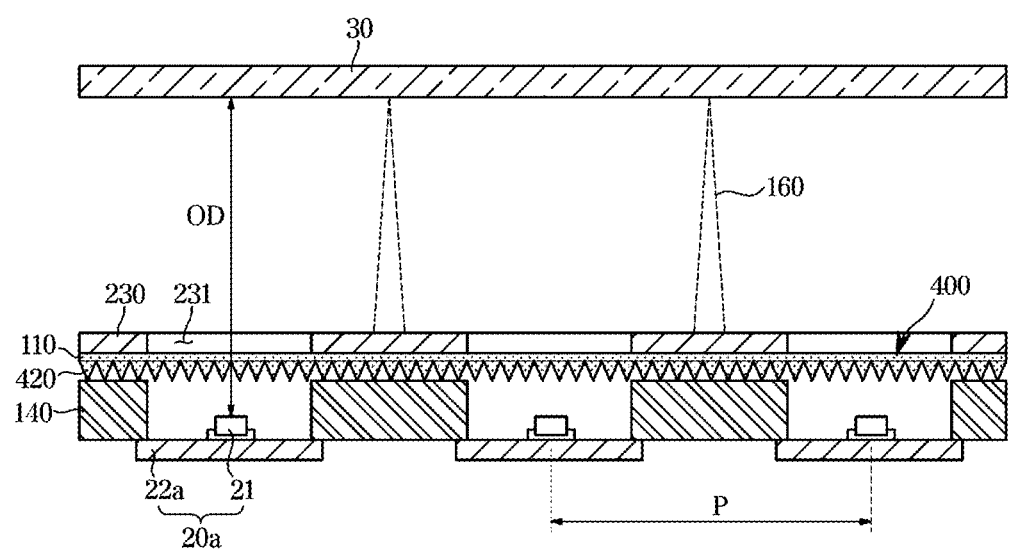
FIG. 10 is a cross-sectional view of a backlight unit according to another embodiment of the disclosure.
Figure 11:
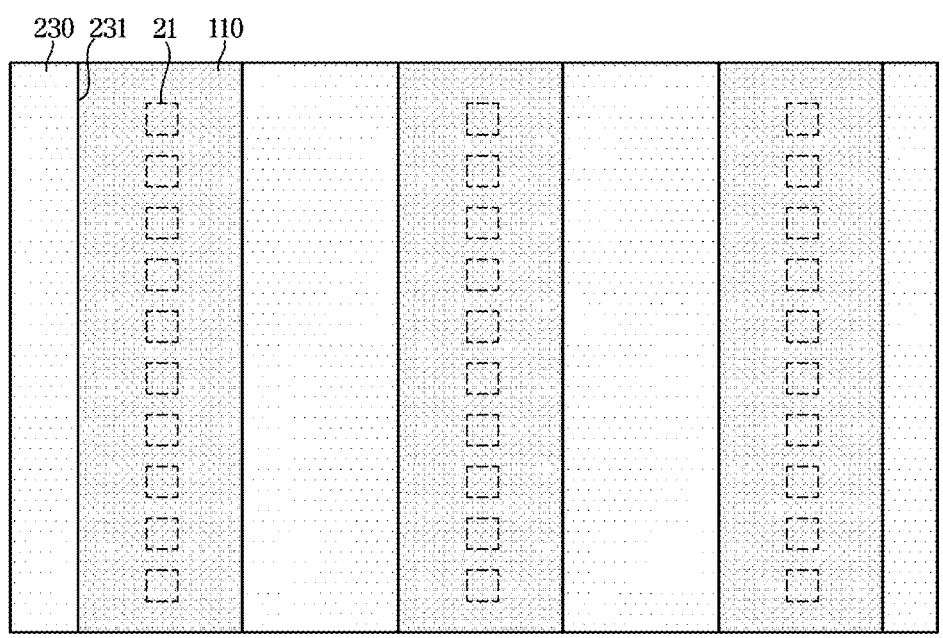
FIG. 11 is a plan view of the reflector sheet shown in FIG. 10.

FIG. 8 is a view illustrating a protrusion of an optical sheet in a backlight unit according to another embodiment of the disclosure. FIG. 9 is a view illustrating a protrusion of an optical sheet in a backlight unit according to another embodiment of the disclosure. FIG. 10 is a cross-sectional view of a backlight unit according to another embodiment of the disclosure. FIG. 11 is a plan view of the reflector sheet shown in FIG. 10.

As shown in FIGS. 8 to 11, the optical sheets 300 and 400 may include a flat portion 110, and the plurality of protrusions 320 and 420 may have a prism shape, and may be arranged in one direction.

The plurality of protrusions 320 and 420 may include vertices 321 and 421 facing the backlight unit 20. The plurality of protrusions 320 and 420 may include first inclined surfaces 322 and 422 and second inclined surfaces 323 and 423 inclined from the flat portion 110 toward the vertices 321 and 421.

The vertex 321 of the plurality of protrusions 320 may have a planar shape so as to be parallel to the flat portion 110. The substrates 22a may be provided in plural, and a plurality of substrates 22a may be arranged to be spaced apart in one direction. The plurality of holes 231 of the reflector sheet 230 may correspond to the plurality of substrates 22a, respectively.

Figure 12:
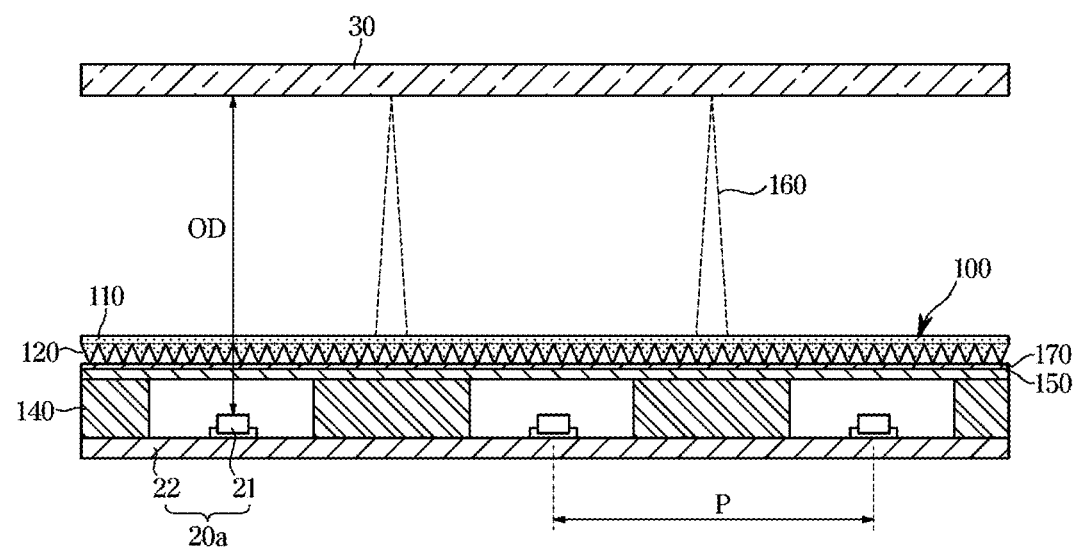
FIG. 12 is a cross-sectional view of a backlight unit according to another embodiment of the disclosure.
Figure 13:
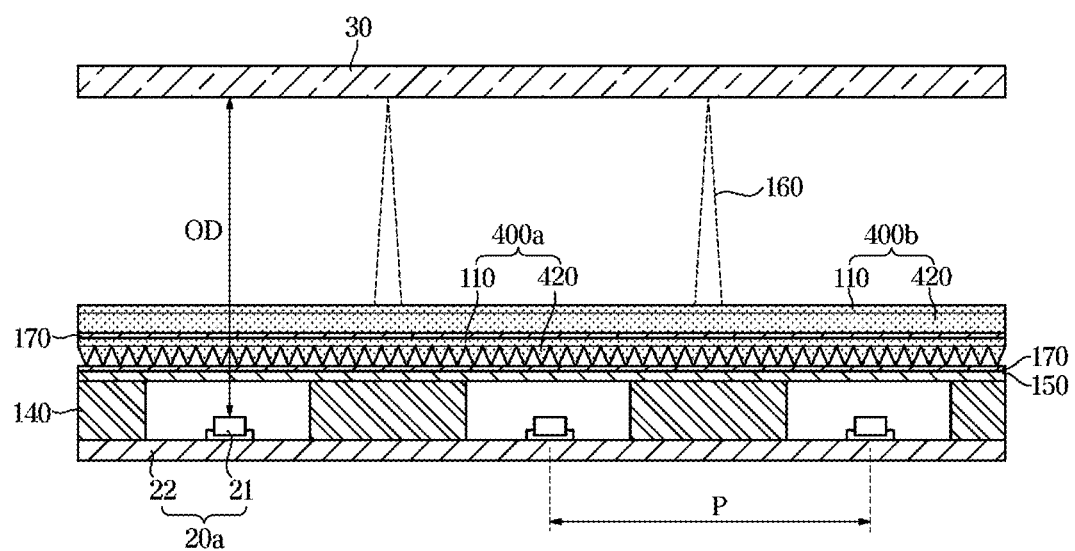
FIG. 13 is a cross-sectional view of a backlight unit according to another embodiment of the disclosure.
Figure 14:
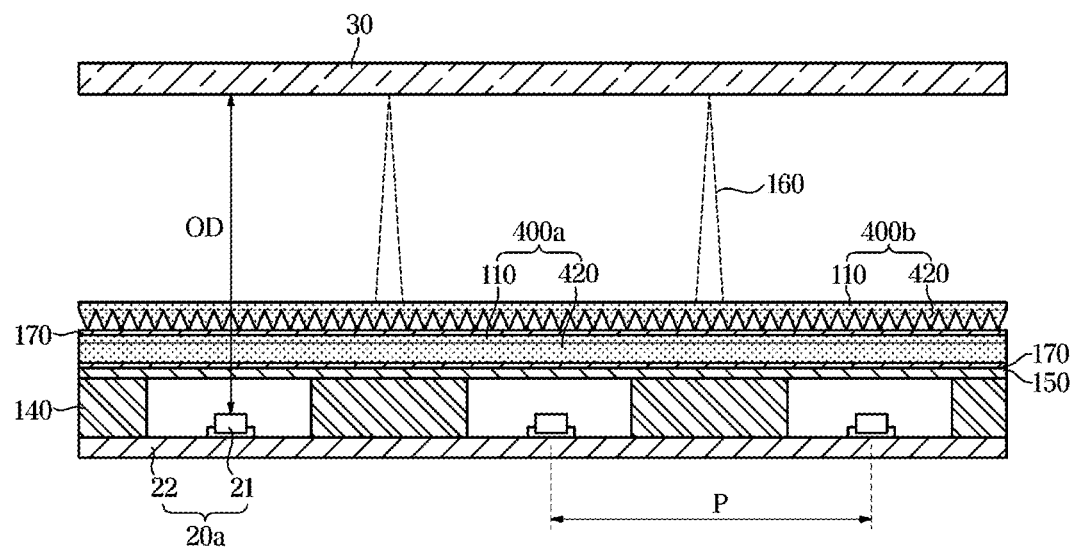
FIG. 14 is another cross-sectional view of the backlight unit according to another embodiment of the disclosure in FIG. 13.

FIG. 12 is a cross-sectional view of a backlight unit according to another embodiment of the disclosure. FIG. 13 is a cross-sectional view of a backlight unit according to another embodiment of the disclosure. FIG. 14 is another cross-sectional view of the backlight unit according to another embodiment of the disclosure in FIG. 13.

As shown in FIG. 12, the disclosure may include a base sheet 150 coupled to the vertices 121 (see FIG. 4) of the plurality of protrusions 120 and having a planar shape so that the luminance of the display panel 10 (see FIG. 2) is uniform.

The optical sheet 400 may include a first optical sheet 400a in which a plurality of protrusions 420 are arranged in a first direction, and a second optical sheet 400b disposed between the first optical sheet 400a and the diffusion plate 30 and having a plurality of protrusions 420 arranged in a second direction perpendicular to the first direction.

Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

The invention claimed is:

1. A backlight unit comprising:
a plurality of light sources;
a substrate configured to drive the plurality of light sources;
a diffusion plate provided to diffuse light emitted from the plurality of light sources;
an optical sheet disposed between the plurality of light sources and the diffusion plate and having a plurality of protrusions having a pyramidal shape;
a reflector sheet disposed between the diffusion plate and the optical sheet and including a plurality of holes provided to allow the light emitted from the plurality of light sources to pass through the reflector sheet and corresponding to the plurality of light sources, respectively; and
a spacer disposed between the optical sheet and the substrate to support the optical sheet,
wherein the plurality of protrusions protrude toward the plurality of light sources so that the light emitted from the plurality of light sources is incident onto the plurality of protrusions, and
wherein the optical sheet is disposed between the reflector sheet and the spacer.

2. The backlight unit of claim 1, wherein one ends of the plurality of protrusions facing the plurality of light sources include a flat vertex.

3. The backlight unit of claim 2, wherein an area of the flat vertex is 20% or less of an area of each of the plurality of protrusions.

4. The backlight unit of claim 1, wherein a distance between the optical sheet and the plurality of light sources is 50% or less of a distance between the diffusion plate and the plurality of light sources.

5. The backlight unit of claim 1, wherein the optical sheet is configured to retroreflect light incident on the optical sheet.

6. The backlight unit of claim 1, wherein the plurality of protrusions have a triangular pyramid shape.

7. The backlight unit of claim 1, wherein the plurality of protrusions have a square pyramid shape.

8. The backlight unit of claim 1,
wherein a distance between the diffusion plate and the plurality of light sources is smaller than a square root of a number obtained by dividing an area of a display panel into which light diffused from the diffusion plate is incident, by the number of the plurality of light sources.

9. A liquid crystal display apparatus, comprising:
a display panel; and
a backlight unit having a plurality of light sources provided to emit light to the display panel,
wherein the backlight unit further comprises:
- a diffusion plate disposed between the display panel and the plurality of light sources, an optical sheet disposed between the plurality of light sources and the diffusion plate and having a plurality of protrusions having a pyramidal shape,
- a reflector sheet disposed between the diffusion plate and the optical sheet and including a plurality of holes provided to allow the light emitted from the plurality of light sources to pass through the reflector sheet and corresponding to the plurality of light sources, respectively; and
- a spacer disposed between the optical sheet and a substrate to support the optical sheet, wherein the plurality of protrusions protrude toward the plurality of light sources so that the light emitted from the plurality of light sources is incident onto the plurality of protrusions, and wherein the optical sheet is disposed between the reflector sheet and the spacer.

10. A backlight unit, comprising:
a plurality of light sources;
a diffusion plate provided to diffuse light emitted from the plurality of light sources;
an optical sheet disposed between the plurality of light sources and the diffusion plate and having a plurality of prismatic protrusions arranged in succession;
a reflector sheet disposed between the diffusion plate and the optical sheet and including include a plurality of holes provided to allow the light emitted from the plurality of light sources to pass through the reflector sheet and corresponding to the plurality of light sources, respectively; and
a spacer disposed between the optical sheet and a substrate to support the optical sheet, wherein the plurality of protrusions protrude toward the plurality of light sources so that the light emitted from the plurality of light sources is incident onto the plurality of prismatic protrusions, and wherein the optical sheet is disposed between the reflector sheet and the spacer.

11. The backlight unit of claim 10, wherein one ends of the plurality of prismatic protrusions facing the plurality of light sources include a flat vertex.

12. The backlight unit of claim 11, wherein an area of the flat vertex is 20% or less of the area of each of the plurality of prismatic protrusions.

13. The backlight unit of claim 10, wherein a distance between the optical sheet and the plurality of light sources is 50% or less of a distance between the diffusion plate and the plurality of light sources.

14. The backlight unit of claim 10,
wherein a distance between the diffusion plate and the plurality of light sources is smaller than a square root of a number obtained by dividing an area of a display panel into which light diffused from the diffusion plate is incident, by the number of the plurality of light sources.

* * * * *